United States Patent [19]

Hutchins, Jr.

[11] 4,204,129
[45] May 20, 1980

[54] CAPACITANCE-COMPENSATED CABLE

[75] Inventor: Loren H. Hutchins, Jr., Portsmouth, N.H.

[73] Assignee: Simplex Wire and Cable Company, Portsmouth, N.H.

[21] Appl. No.: 859,163

[22] Filed: Dec. 9, 1977

Related U.S. Application Data

[63] Continuation-in-part of Ser. No. 668,267, Mar. 18, 1976, abandoned.

[51] Int. Cl.² ........................ H01B 9/04; H01B 7/30
[52] U.S. Cl. .................................. 307/147; 307/146; 174/102 R; 333/34; 323/105
[58] Field of Search ............... 307/147, 148; 323/105; 333/96, 24 C, 33, 34; 174/102 R

[56] References Cited
U.S. PATENT DOCUMENTS 1,825,624  9/1931  Nickle .......................... 307/147 X
3,484,679  12/1969  Hodgson ...................... 307/147 X

*Primary Examiner*—Michael L. Gellner
*Assistant Examiner*—S. D. Schreyer
*Attorney, Agent, or Firm*—Brooks, Haidt, Haffner & Delahunty

[57] ABSTRACT

This invention relates to the transmission of electric power and in particular provides an electric power-transmission system having reduced vector regulation, voltage drop, and power loss through the inclusion of capacitance in the cable in series between the generator and load by utilizing electric conductors, i.e., connective links, having capacitance distributed along the length of the cable. Such capacitance is achieved by dividing a conductor into two parts which are separated by dielectric material such that the two conductor parts are in capacitive relation along the length of the cable and by connecting one conductor part to the generator and the other conductor part to the load such that the distributed capacitance is in series with the generator and load.

10 Claims, 14 Drawing Figures

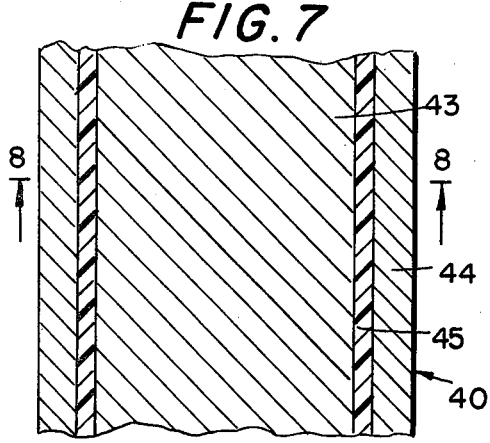
FIG. 7
FIG. 8
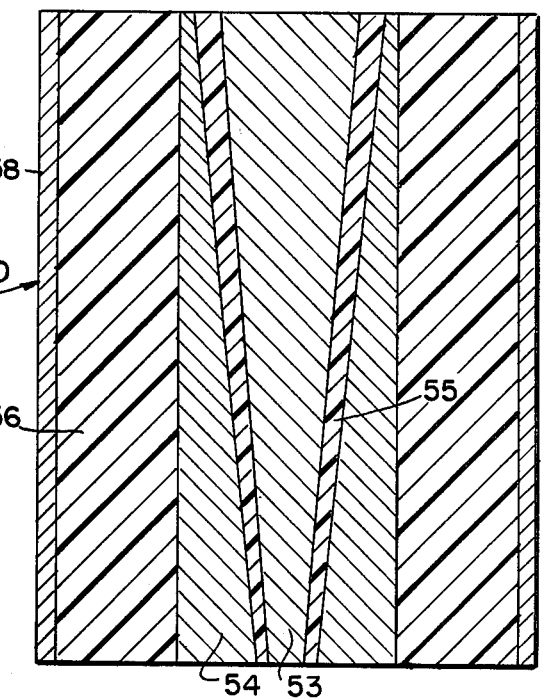
FIG. 9
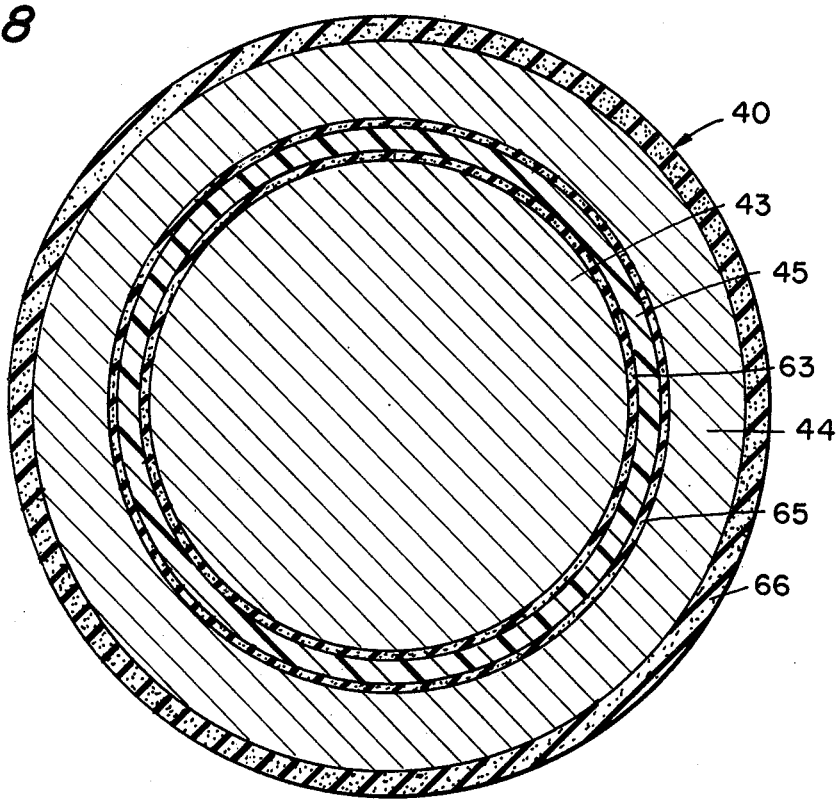
FIG. 10

CAPACITANCE-COMPENSATED CABLE

RELATED CASES

This application is a continuation-in-part of copending Hutchins application Ser. No. 668,267 filed Mar. 18, 1976, now abandoned.

Frequently, electric power is generated at locations remote from the place of usage. This has resulted in the construction of power grids throughout the nation and elsewhere for the bulk transmission of power from the places of generation to the places of utilization. Because large quantities of power are involved and distances are frequently quite long, the propagation constant of the transmission system itself causes significant loss in power and high vector regulation values.

It is thus an important object of the present invention to provide a power-transmission system for handling bulk electric power over long distances with significantly improved cable propagation constant such that reduced regulation is possible and concommitantly the capital investment in the construction of any given cable can be reduced.

It is a further important object of the present invention to provide electric-cable constructions suitable for use in power-transmission systems that are designed to minimize cable losses and for use in communication systems that are designed to maximize the rate of change of arrival current.

In accordance with the present invention, these and other objectives are obtained essentially by constructing transmission systems in which the electrical transmission line contains built-in capacitance which is connected in series between the generator and the load. Thus, in accordance with the present invention, each conductor (connective link) in a transmission line is divided into parts which are separated by dielectric material such that there is distributed capacitance along the length of the cable between the conductor parts. It is further contemplated that one conductor part is connected to the load and the other to the generator such that the distributive capacitance is connected in series between the generator and the load.

Typically, in present-day practice, power transmission is three-phase at fifty or sixty Hz. Thus, in a typical case, three such connective links are used as the transmission line for connecting a particular power source with a particular load. The generator or power source, of course, can be any source or multiple sources of supply of electric power and the load can be a single device but more frequently will be a distribution system as, for example, in a city or other area.

In the preferred arrangement, the connective links of such power-transmission system involve in each case a cable having an inner-conductor part and an outer-conductor part separated by a layer in the form of an annulus of dielectric material preferably having a relatively high dielectric constant. Also in the preferred arrangement, the cross-sectional area of the two conductor parts of each connective link is varied along the length of the cable such that the conductor part connected to the generator is at a maximum cross-section at the end of the cable adjacent to the generator and at a minimum at the end of the cable adjacent to the load. Similarly, the conductor part connected to the load is at a minimum in cross-sectional area at the end of the cable adjacent to the generator and at a maximum adjacent to the load. Preferably, the cross-sectional area of the two conductor parts is varied uniformly along the length of the cable and will generally equal a constant total area. Similarly, the spacing between the conductor parts and the areas of the conductor surfaces confronting each other are accordingly adjusted such that the capacitance between the two conductor parts is uniformly distributed along the length of the cable. In this contemplated divided conductor, it will, of course, be apparent that a voltage drop exists between one conductive portion and the other. This voltage drop influences the choice of dielectric material and dielectric spacing along the length of the cable.

Four general constructions in accordance with this invention are apparent. In one case, the simple one, in which the preferred variation in cross-sectional areas of the conductor parts is not utilized, the two conductor parts have equal cross-sections along the length of the cable. The outer-conductor part in this case is a cylindrical annulus and the inner-conductor part is a co-axial cylinder separated from the outer-conductor part by a cylindrical annulus of dielectric material. The other three instances, which still permit a generally uniform outside cable diameter, involve the preferred arrangement of varying the area of the conductor parts along the length of the cable to accommodate the current-carrying requirements of the two conductor parts of each cable. Generally, variation in conductor cross-section is accomplished stepwise, rather than continuously and when high potentials are involved, tapered transitions between stepwise changes in conductor part areas are desirable to avoid points of high electric stress.

In one arrangement, the two conductor parts are separated by a cylindrical annulus of dielectric such that the inner diameter of the outer-conductor part and the outer diameter of the inner-conductor part are constant along the length of the cable. In this arrangement, the inner-conductor part is hollow, and the inner diameter of the inner conductor part decreases along the length of the cable from one end to the other. The outer-conductor part, which is co-axially positioned about the inner-conductor part, similarly has an outside diameter which decreases along the length of the cable from the same one end to the other, such that the cross-sectional areas of the two conductor parts vary inversely and uniformly along the length of the cable for a constant total cross-section. Although this construction involves a change in the outside diameter along the length of the cable, the variation is not significant in the overall construction, and preferably is eliminated in overall construction through varying the wall thickness of an outer jacket.

In another arrangement, the outer-conductor part is separated from the inner-conductor part by a co-axial conical annulus of dielectric material. In this arrangement, the outer-conductor part has a constant outside diameter but has an inside diameter decreasing along the length of the cable from one end to the other. The inner-conductor part in this arrangement is typically an elongated conical solid having its outer diameter varying inversely with the inside diameter of the outer conductor part.

In the last arrangement, the two conductor parts are separated by a conical annulus of dielectric material. The outer diameter of the inner-conductor part and the outer diameter of the outer-conductor part are constant along the length of the cable. In this arrangement, the inner-conductor part is hollow, and the inner diameter of the inner conductor part decreases along the length of the cable from one end to the other. The inner diameter of the outer-conductor part increases along the length of the cable from the same one end to the other, such that the two conductor parts vary inversely and uniformly along the length of the cable for a constant total cross-section.

In power-cable application, the dielectric constant of the insulating material separating the conductor parts should be as high as feasible, preferably 6 to 8 or higher, and the dissipation factor as low as feasible. This insulating (dielectric) material should also have high dielectric strength, i.e, 500 volts per mil or higher. Both are required in order to optimize the distributed capacitance. With long cables, of course, lower dielectric constants can be tolerated.

For a more complete understanding of the practical application of this invention, reference is made to the appended drawings in which:

FIG. 7 is a fragmentary, longitudinal section view of another cable in accordance with this invention;

FIG. 8 is a cross-sectional view taken at line 8—8 in FIG. 7;

FIG. 9 is a foreshortened longitudinal view of another cable in accordance with this invention;

FIG. 10 is a cross-sectional view of a cable in accordance with this invention showing significant construction details;

Figure 1:
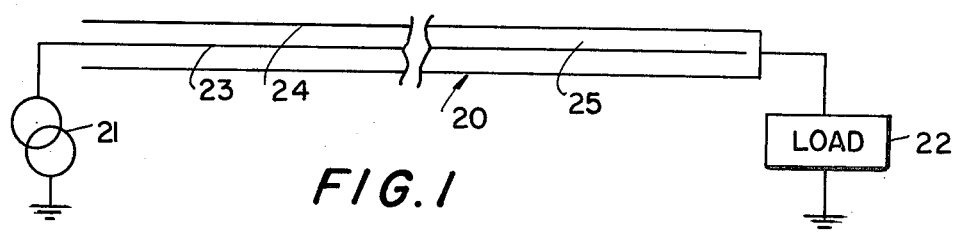
FIG. 1 is a schematic representation of a single-phase transmission system in accordance with this invention.

Referring particularly to FIG. 1, there is shown schematically a cable 20 in accordance with the present invention providing a connective link in a transmission line between an electric signal or power generator 21 and a load 22 having a ground return, for example, in the form armor wires in the event cable 20 is a submarine cable. Cable 20 itself is composed of two conductor parts, an inner-conductor part 23 and a co-axially positioned outer-conductor part 24 which is separated along the length of cable 20 from conductor part 23 by an annulus 25 of dielectric material.

In order that cable 20 form a connective link between generator 21 and load 22, it is important that the capacitance between conductor parts 23 and 24 be large so the impedance of cable 20 between generator 21 and load 22 is small. Thus, a dielectric utilized to form annulus 25 must have a high breakdown strength and a high dielectric constant. At the same time, it is important that the spacing between conductor parts 23 and 24 be as small as possible, consistent with the breakdown strength of the dielectric, and that the confronting surfaces of conductor parts 23 and 24 be as large as possible. The last criterion is most easily met when long lengths of large-conductor cable are employed, and, indeed, facilitates the application of this invention to long transmission lines with large conductor sizes such as in the transmission of power. The invention also has application to signal transmission, as in the transmission of telegraph signals by submarine cable.

Initially, it was believed that, since cables in power transmission networks have inductive reactances, the capacitive reactance built into cable 20 by dividing the connective link into conductor parts forming a capacitor, should match the inductive reactance of the line at the power frequency. It has now been found, however, that the more capacitive reactance provided in cable 20, the better, and the capacitive reactance which should be built into the cable is not limited by the inductive reactance of cable 20.

Referring to FIGS. 2, 3, 4, 5, and 6, there is illustrated a practical construction of a cable 30 in accordance with this invention which is designed to form one connective link of a three-phase transmission line. Cable 30 is made in a number of sections, 30A representing one end section, 30B representing a number of intermediate sections serially interconnected and spliced together, 30C representing a single middle section, 30D representing a number of intermediate sections spliced together serially, and 30E representing the other end section.

In the end section 30A, a central conductor part 33 of circular cross-section is enclosed with a narrow annulus 35 of dielectric material, for example, by serving tapes of, or extruding, solid dielectric about central-conductor part 33. Thereafter, a very thin layer of an outer conductor 34, for example, in the form of a single layer of copper strands 34, is applied over dielectric annulus 35. Finally, a protective jacket 36 is applied as an outer covering. The dielectric material used to form annulus 35 as pointed out above should have high dielectric breakdown strength and high dielectric constant. Protective jacket 36 can be any commonly used semi-conducting material, followed by shunt dielectric material (not shown), which can be omitted in the event the cable is designed for aerial transmission. If the cable is to be used as a submarine cable, additional armor wires of copper and/or steel will be desirable.

Figure 2:
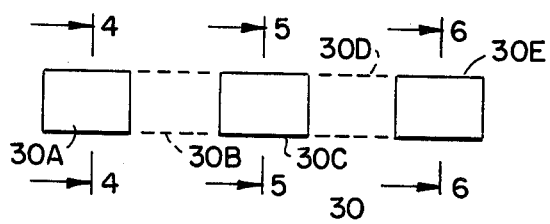
FIG. 2 is an elevation of a length of cable incorporating capacitance loading in accordance with this invention.
Figure 3:
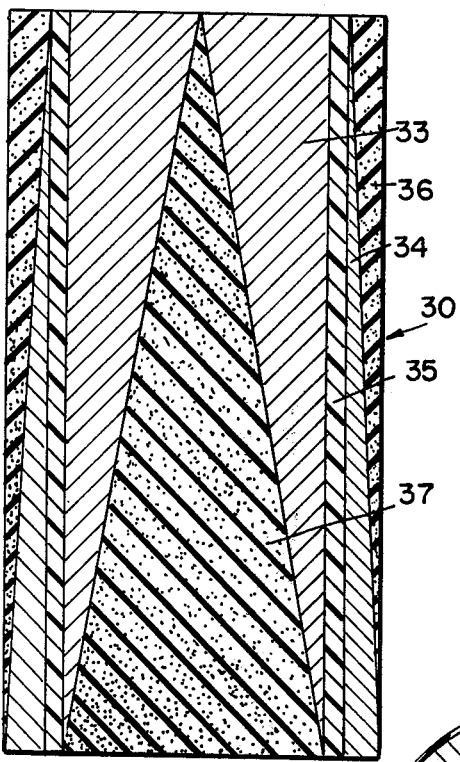
FIG. 3 is a foreshortened longitudinal section of the cable in FIG. 2.
Figure 4:
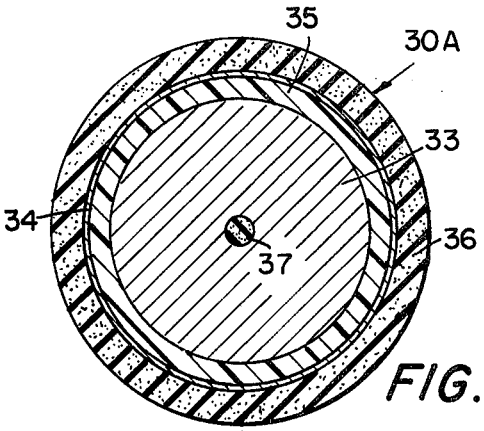
FIG. 4 is an enlarged, cross-sectional view taken at line 4—4 at one end of the cable shown in FIG. 2.

As the cable construction is assembled by splicing together sections, the additional sections added, indicated by the reference numeral 30B, are further supplied with an inner core 37 inside of inner-conductor part 33. Inner core 37 is typically formed of dielectric material which can be any convenient insulating material which can be in the form of strands, or of tape. As the manufacture of the cable proceeds from left to right as shown in FIG. 2 and strands of dielectric 37 are added as a core, strands of copper are removed from inner-conductor part 33, and strands of copper are added to outer-conductor part 34. In this construction, in order to provide uniform capacitance between inner-conductor part 33 and outer-conductor part 34 along the length of cable 30, the outside diameter of inner-conductor part 33 is kept constant as is the inside diameter of outer-conductor part 34 such that the areas of the confronting surfaces of inner- and outer-conductor parts 33 and 34 remain uniform along the length of cable 30 and remain uniformly spaced along the length of cable 30.

Thus, the cross-sectional area of inner-conductor part 33 is reduced approximately at a uniform rate from left to right on cable 30 as seen in FIG. 2. At the same time, the cross-sectional area of outer-conductor part 34 is increased uniformly from left to right along cable 30 as seen in FIG. 2. Moreover, the rate of decrease in cross-sectional area of cable part 33 is equal to the rate of increase in cross-sectional area of cable part 34 simply by exchanging strands of copper from inner part 33 to outer part 34. Consequently, the total conductor cross-sectional area is constant along the length of cable 30. This is desirable in order to maintain essentially uniform current density along the length of cable 30 in order to strike a balance between resistive losses in the cable and the economics of supplying additional copper.

Figure 5:
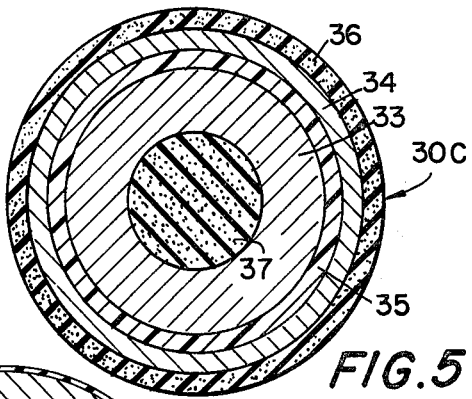
FIG. 5 is an enlarged, cross-sectional view taken at line 5—5 halfway along the length of the cable shown in FIG. 2.
Figure 6:
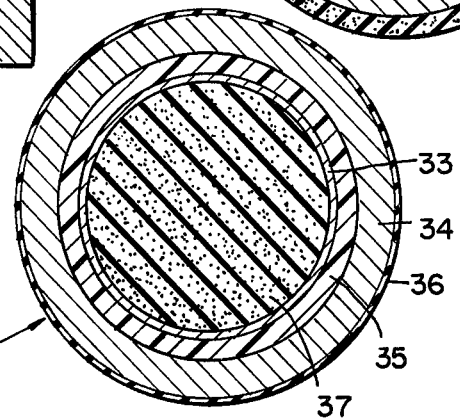
FIG. 6 is an enlarged, cross-sectional view taken at line 6—6 at the other end of the cable shown in FIG. 2.

As seen in FIG. 5, which represents the construction of cable 30 at its mid-section 30C, the cross-sectional area of inner-conductor part 33 is equal to the cross-sectional area of outer-conductor part 34. At the right-end section 30E as seen in FIG. 6, the inner-conductor 33 is reduced to a few strands, while outer conductor 34 contains substantially all of the copper in cable section 30E.

As illustrated in FIG. 2 and described above, cable 30 is constructed in discrete lengths 30A, B, C, D, E, etc., each of which is uniform along its length, but which change stepwise. In order to avoid high electric stress at the transitions, tapered transitions are desirable and should be employed.

Typically, cable 30 is utilized along with two similar cables as a transmission line between a generator for three-phase alternating current and a load. It is a matter of little importance whether the inner-conductor part or the outer-conductor part is that portion of the cable connected to the source of electric power and similarly, whether it is connected to the load. The essential fact is that at end section 30A, inner-conductor part 33 is connected to one of the source and load and at end section 30E, the outer-conductor part 34 is connected to the other of the source and load, such that the capacitance distributed along the length of cable 30 formed by the large capacitor comprising conductor parts 33 and 34 and dielectric 35 is connected in series between the power source and the load.

FIGS. 7 and 8 illustrate another cable construction in accordance with this invention in which the reference numeral 40 designates a cable in accordance with the invention. Cable 40 has an inner-conductor part 43 of generally cylindrical configuration which can be formed of compacted copper strands. Cable 40 is also provided with an annular layer 45 of dielectric which can be applied by extrusion or taping co-axially about inner-conductor part 43. Finally, cable 40 is provided with an outer-conductor part 44 formed of stranded copper. While cable 40 has the disadvantage that the cross-sectional area provided by conductor parts 43 and 44 is greater for a given current-carrying capacity than would be required with cable 30, as the cross-sectional areas of conductor parts 43 and 44 must not only be approximately equal but their total must be approximately twice as great as that of conductor parts 33 and 34 in cable 30 for a given current-carrying capacity cable 40 has the advantage of simplicity of construction and may be indicated where manufacturing costs, as distinguished from material costs, are a controlling factor. Cable 40, of course, is utilized as is cable 30 with one of conductor parts 43 and 44 being connected at one end of cable 40 to a source of electric power and the other being connected at the other end to a load, as part of a transmission line. Cable 40 can, of course, be provided with jacket and armoring as required by the indicated location of the transmission line.

FIG. 9 indicates in foreshortened longitudinal section yet another example of a cable in accordance with the present invention. In FIG. 9, the reference number 50 indicates a cable which is intended to function as one of the connective links in a transmission line between a source of alternating electric power and the load. Cable 50 contains an inner-central-conductor part 53 of generally circular cross-section and an outer-conductor part 54 of annular cross-section separated by a conical annulus 55 of insulating material having high dielectric strength and dielectric constant.

The diameter of inner conductor part 53 decreases from one end of cable 50 to the other while the inside diameter of conductor part 54 similarly decreases. The outside diameter of conductor part 54 remains constant along the length of cable 50. In addition, the spacing between conductor parts 53 and 54, i.e., the thickness of dielectric 55, decreases from one end of cable 50 to the other as the outside diameter of inner conductor 53 similarly decreases in order that the capacitance between conductor parts 53 and 54 remain uniform along the length of cable 50. The decrease in thickness of dielectric 55 is approximately in direct proportion to the rate of decrease in diameter of conductor 53. Cable 50 is further shown provided with insulating covering 56 for conductor parts 53 and 54 which can be applied over the outside of conductor part 54, for example, by extrusion, and armor 58 which can be in the form of a single layer of helically-applied copper and/or steel strands which function also as a return conductor.

As in the case of cable 30, cable 50 is typically constructed as a number of serially interconnected sections of generally uniform dimensions in which from one end to another, strands of copper from the inner conductor part 53 are transferred to the outer part 54. Tapered transitions from one section to the next are accordingly used. Again, cable 50 is intended for use in a transmission line along with similar cables with inner conductor 53 connected at one end of the cable and outer conductor 54 connected at the other end of the cable between a source of alternating electric power and a load.

Since cables of the type described above are particularly useful in the transmission of bulk power and since bulk power is transmitted at extremely high voltages, the considerations normally required in construction of high-voltage transmission lines must be maintained. Thus, for example, referring to FIG. 10 which is a cross-section of a typical cable, such as cable 40, but showing only conductive parts 43 and 44 and dielectric 45, inner-conductor part 43 which can be 2000 kcmil compressed copper strands having an outside diameter of 1.630 inches, has a semi-conducting layer 63 between it and dielectric 45. A semi-conducting layer 65 is positioned between dielectric 45 and conductor part 44, and a semi-conducting layer 66 is positioned on the outside of conductor part 44.

The semi-conducting layer 63 can be in the form of extruded polyethylene containing carbon black and has a thickness of 0.065 inches. Dielectric 45 is in the form of a serving of polyvinyl-fluoride tapes and has a thickness of 0.170 inches. Semi-conducting layer 65 has no measurable thickness and typically is in the form of a serving of semi-conducting tape. Conductor part 44 has an inside diameter of 2.10 inches and an outside diameter of 2.66 inches, and is formed of copper strands having 2000 Kcmil. Outer semi-conducting layer 66 is also carbon-black-loaded polyethylene and is applied by extrusion with a thickness of 0.100 inches giving the conductor portion of the cable an outside diameter of 2.86 inches including semi-conducting layer 66.

In order to compare cable constructions in accordance with the present invention with conventional cables, calculations have been made for specific cable constructions for a three-phase transmission system having a length of 50 nautical miles (304,350 feet) designed for a line-to-line load voltage of 230 kilovolts at 60 Hertz. By assumption, the generated power is 500 megawatts, the load power factor is 95 percent lagging, the maximum allowable center-conductor temperature is 80° C., and ambient water temperature is 20° C. The transmission line is in the form of three single-conductor deep-sea armored submarine cables.

In the conventional case, the single conductor of each cable is 2000 kcmil compressed copper strands coaxially positioned in polyethylene having an outside diameter of 4.69 inches over which one layer of sixteen 0.250-inch diameter soft-copper wires plus one hundred forty-four 0.069 inch diameter high-strength steel wires (forty-eight polyethylene-jacketed triads) is served in abutting relationship. Normal usage of semi-conducting layers adjacent to the insulation on the inner and outer surfaces is utilized. Calculations show a phase voltage of 132,791 volts and a line current of 1,258 amperes at the load end and a phase voltage of 140,399 volts and a line current of 1,191 amperes at the generator end. Power delivered to the load is 476.172 megawatts, and cable power loss is thus 23.828 megawatts or 5.0 percent of load power. Line voltage drop is 10.1 percent of load voltage and verctor regulation is 10.84 percent.

Under the same conditions of cable length and required load utilizing three armored submarine cables in accordance with the present invention in which the central conductor of each cable is divided as described above with respect to cable 40 into an inner-conductor part 43 and an outer-conductor part 44, the cable is constructed utilizing 5,000-foot sections of uniform construction in which the total conductor area is 2,000 Kcmil. The outer insulation, armor and jacket are in the conventional cable described above. The conductor parts are separated by polyvinyl-fluoride tapes (or extruded PVF) having a thickness of 0.170 inch (K=13.4) and also by a semi-conducting layer adjacent to the inner conductor part having a thickness of 0.065 inch. The required generator voltage is 140,601 volts per phase at 1,268 amperes per phase with a leading power factor of 93.5% for a total generator power requirement of 166.667 megawatts per phase. The power loss in the cable is thus 6.749 megawatts per phase, or 4.22% of load power. The vector regulation is 4.22%. When the inner-conductor part is connected to the generator and the outer-conductor part is connected to the load, the inner-conductor at the load end is at 137,275 volts to ground such that the voltage between the conductor parts at the load end is 6,403 volts. The outer-conductor at the generator end is at 138,013 volts to ground such that the voltage between the conductor parts at the generator end is 7,376 volts. At open circuit, the voltage at the load end is 136,443 volts to ground. The distributed shunt capacitance is 0.0529 µf per 1,000 feet, and the distributed series capacitance is 1.528 µf per 1,000 feet.

Figure 11:
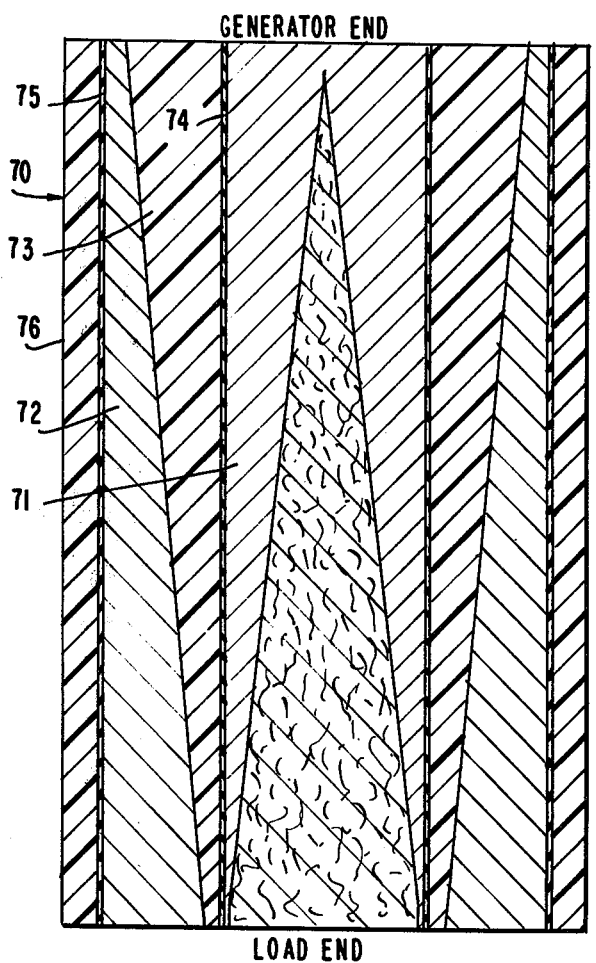
FIG. 11 is a foreshortened longitudinal view of another cable in accordance with this invention.

FIG. 11 indicates in foreshortened longitudinal section still another example of a cable constructed in accordance with the present invention. The reference number 70 indicates a cable intended to function as one of the links between an alternating-electric-power source and a load, and in a system wherein the power flows in one direction only, such as from a platform in the ocean to a power grid on shore. In cable 70, the conductor is divided into an inner-conductor part 71 and an outer-conductor part 72 separated by a dielectric wall 73. Inner-conductor part 71 has a uniform outer diameter but is hollow with a tapering inner diameter. Outer-conductor part 72 also has a uniform outer diameter and tapering inner diameter such that the cross-sectional area of conductor parts 71 and 72 remains constant along the cable 70.

Each conductor part 71 and 72 has a semi-conducting coating 74 and 75, respectively, in accordance with conventional practice, and is jacketed with suitable outer insulation 76. Dielectric wall 73, by reason of the above indicated geometry of conductor parts 71 and 72 has its thickness increasing along the length of cable 70. The series-dielectric wall is greatest at the generator end.

Figure 14:
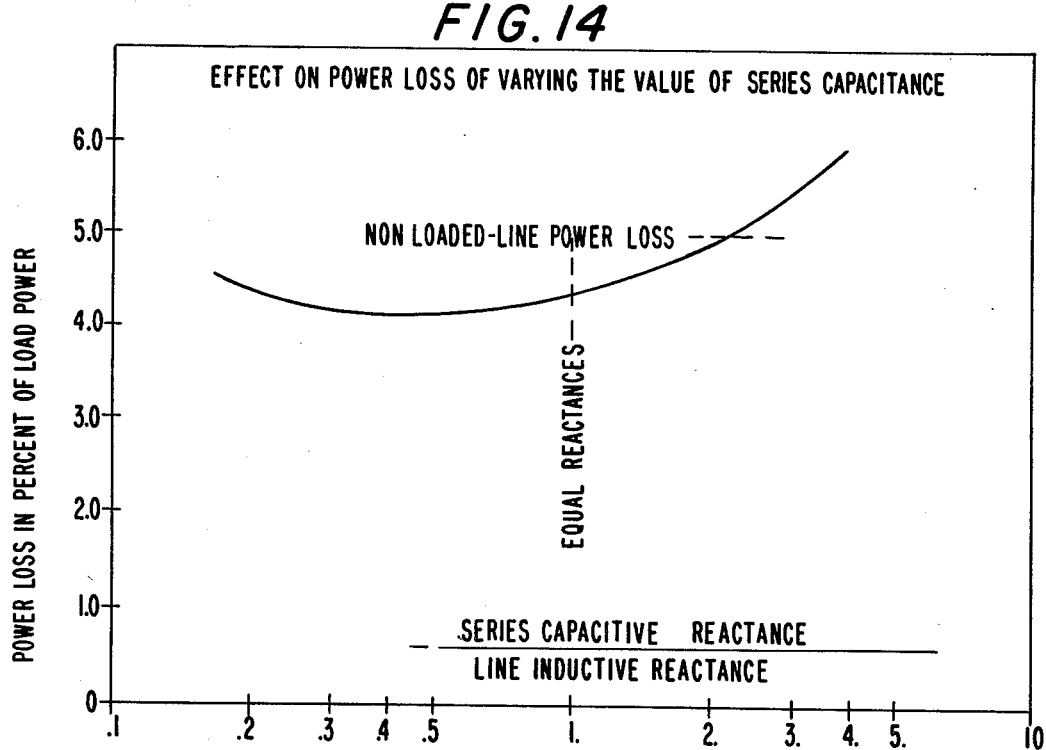
FIG. 14 is a curve showing the change produced in the value of power lost in the cable as the series-compensating capacitance changes in value.
Figure 12:
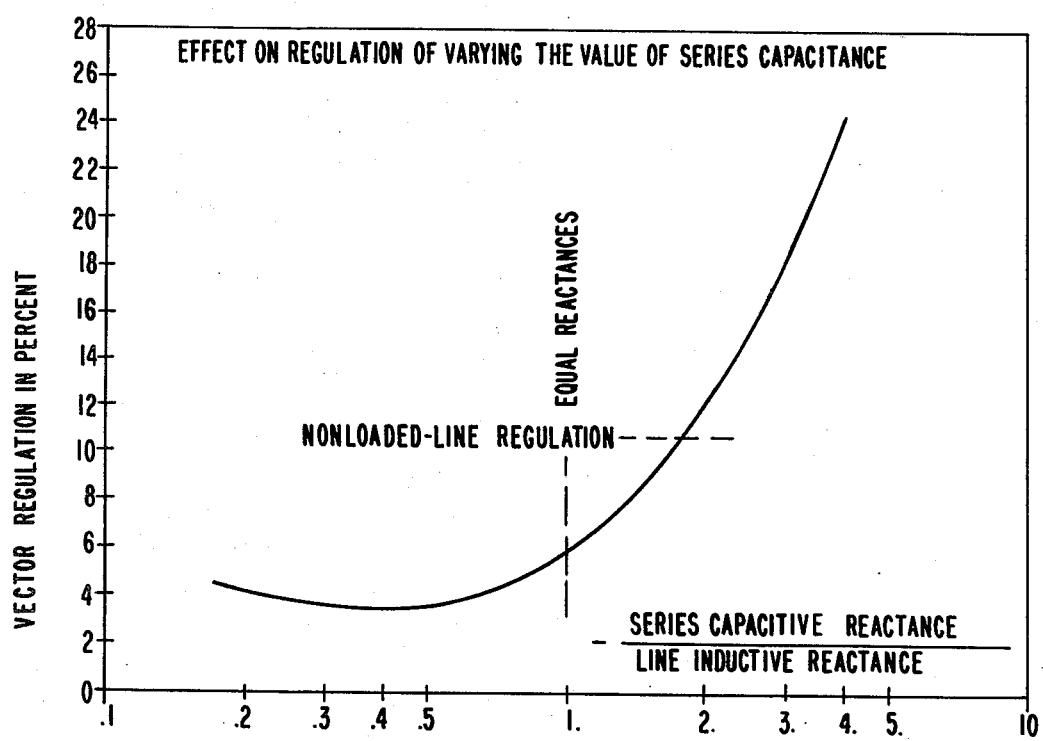
FIG. 12 is a curve showing the change produced in the value of voltage regulation as the series-compensating capacitance changes in value.
Figure 13:
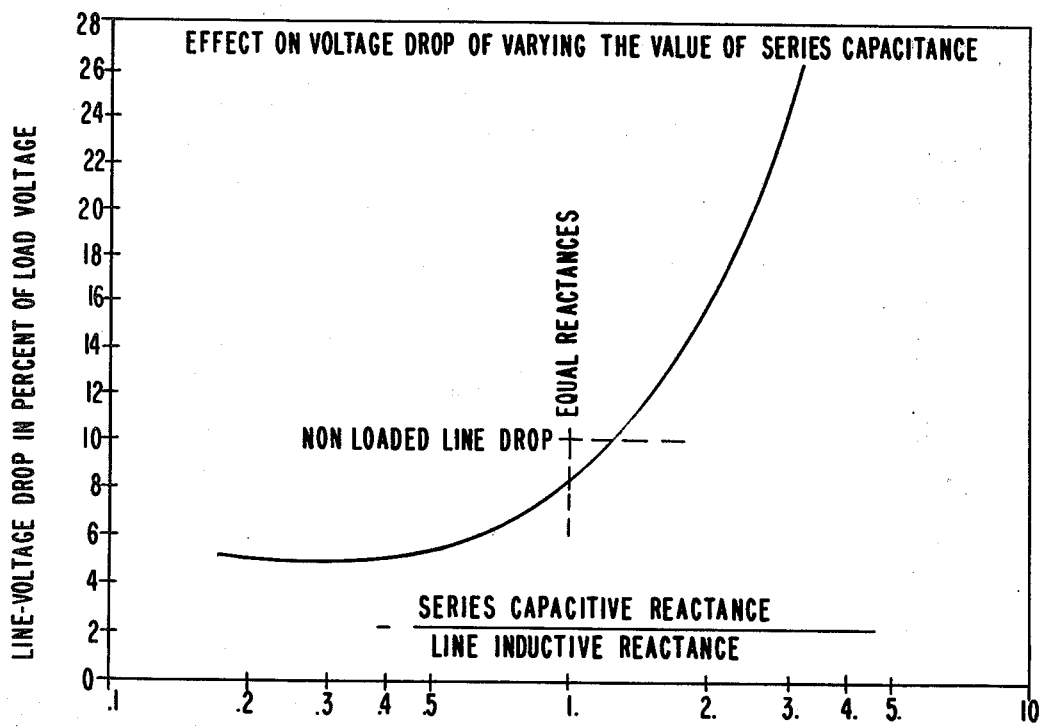
FIG. 13 is a curve showing the change produced in the value of line-voltage drop as the series-compensating capacitance changes in value.

FIGS. 12, 13, and 14 illustrate the manner in which the series capacitive reactance affects the values of regulation, voltage drop, and power loss. Each of these curves was plotted on the basis of a cable having 2000 kcmil copper area in accordance with this invention having a length of 50 nautical miles. Generated power of 500 megawatts with a line-to-line load voltage of 230 kilovolts was assured. "Nonloaded-line" refers to a conventional cable not having series capacitive reactance in accordance with the invention but having otherwise equivalent electrical and mechanical dimensions.

The curves show clearly that when the series capacitive reactance equals the inductive reactance of the line, not one of the three parameters has its minimum value. The minima are achieved when the series reactance is appreciably lower than the line's inductive reactance, which means the compensating capacitance is greater than that necessary to produce equal reactances.

I claim:

1. In an electric-transmission system including a generator of a varying amplitude voltage, an electric load having an inductive power factor, and a transmission line having conductive links interconnecting said generator and said load, the improvement in which said conductive link includes a cable having a first-conductor part extending lengthwise of said cable, a second conductor part extending lengthwise of said cable, and solid dielectric material extending lengthwise of said cable and separating said first-and second-conductor parts in capacitive relationship distributed along the length of said cable, the amount of capacitance between said conductor parts being in excess of that required to match the inductive reactance of said conductive link, said first-conductor part being electrically connected at one end of said cable to said generator and said second-conductor part being electrically connected at the other end of said cable to said load whereby the capacitance between said conductor parts is electrically connected in series between said generator and said load, in which the cross-sectional area of said first-conductor part decreases along the length of said cable from a maximum at said one end of said cable to a minimum at said other end of said cable and in which the cross-sectional area of said second conductor part increases along the length of said cable from a minimum at said one end of said cable to a maximum at said other end of said cable.

2. The improvement according to claim 1 in which one of said first- and second-conductor parts is positioned within the other of said conductor parts and said dielectric material is in the form of an annulus between said conductor parts extending lengthwise of said cable.

3. The improvement according to claim 2 in which said conductor parts and said dielectric material are co-axial.

4. The improvement according to claim 3 in which the annulus of dielectric material is cylindrical.

5. The improvement according to claim 3 in which the annulus of dielectric material is conical.

6. In a transmission line cable, a conductor divided lengthwise of said cable into a first-conductor part and a second-conductor part, each extending lengthwise of said cable, and solid dielectric material extending lengthwise of said cable separating said first-and second-conductor parts in capacitive relationship distributed along the length of said cable, wherein the cross-sectional area of said first-conductor part decreases along the length of said cable from a maximum at one end of said cable to a minimum at the other end of said cable and wherein the cross-sectional area of said second-conductor part increases along the length of said cable from a minimum at one end of the said cable to a maximum at said other end at said cable.

7. The improvement according to claim 6 in which one of said first- and second-conductor parts is positioned within the other of said conductor parts and said dielectric material is in the form of an annulus between said conductor parts extending lengthwise of said cable.

8. The improvement according to claim 7 in which said conductor parts and dielectric material are co-axial.

9. The improvement according to claim 8 in which the annulus of dielectric material is cylindrical.

10. The improvement according to claim 8 in which the annulus of dielectric material is conical.

* * * * *